Patented Feb. 12, 1924.

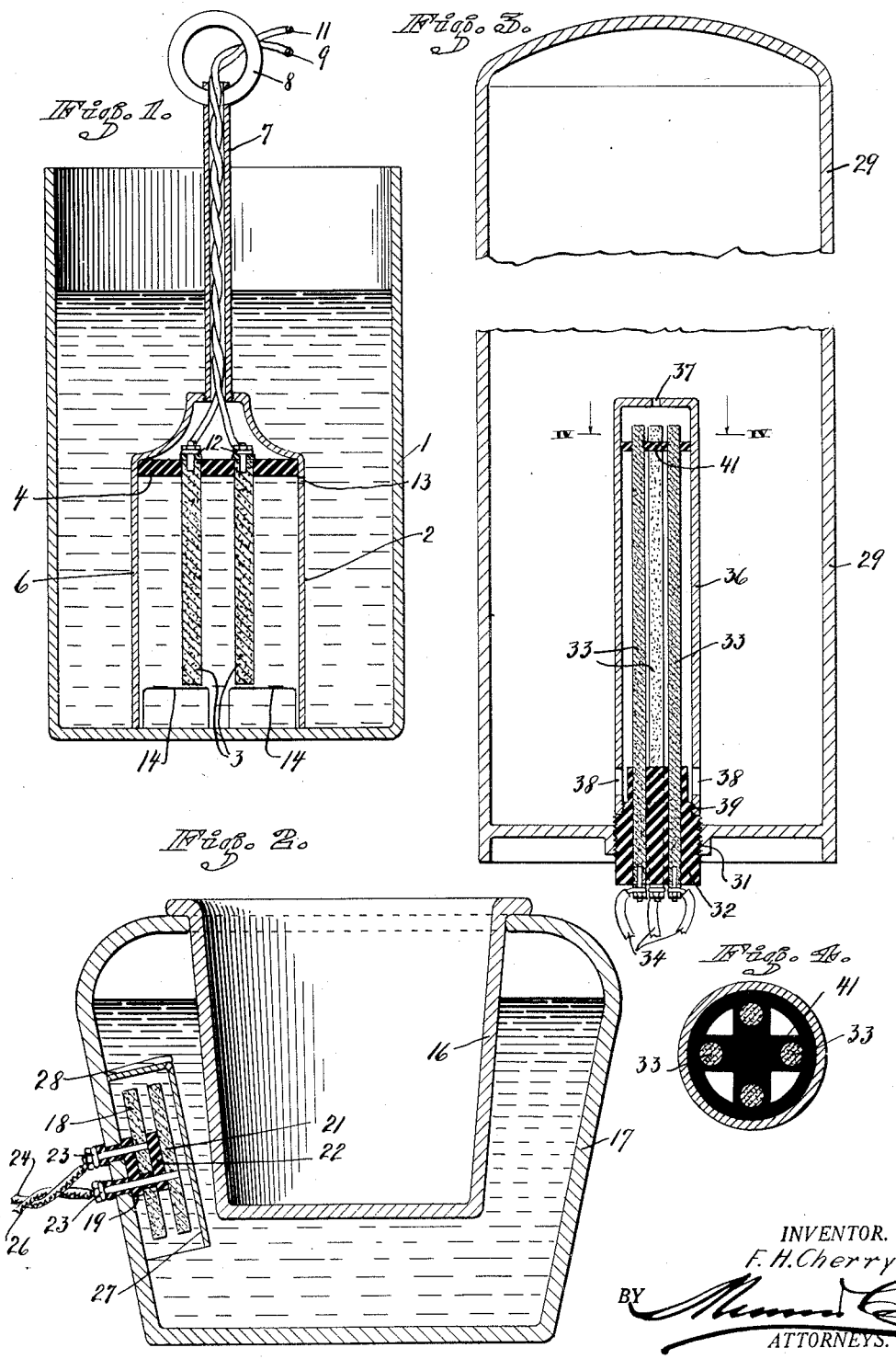

1,483,280

UNITED STATES PATENT OFFICE.

FLOYD H. CHERRY, OF BERKELEY, CALIFORNIA.

SELF-CONTROLLING HEATER.

Application filed January 10, 1923. Serial No. 611,890.

*To all whom it may concern:*

Be it known that I, FLOYD H. CHERRY, a citizen of the United States, and a resident of Berkeley, county of Alameda, State of California, have invented a new and useful Self-Controlling Heater, of which the following is a specification.

The present invention relates to improvements in self-controlling electric heaters for water or other liquids having similar conducting characteristics. It is proposed to utilize for my heater the general principle that water and other similar liquids are poor conductors of electrical current and thereby may be used due to their high resistance directly as the heating elements of electrical heaters. A second principle to be utilized in this invention is the fact that water converted into steam becomes a perfect insulator. In carrying out these general principles it is proposed to submerge two conductors in water or a similar liquid to be heated and to allow a current to pass from one conductor to the other through the liquid whereby the latter is heated. It is further proposed to cover the two conductors by means of a hood or the like that will entrap steam generated by the heated water and cause the same to force the water within and the hood downwardly and either completely or partly out of the space between the two conductors whereby the flow of current is reduced or interrupted altogether due to the insulating qualities of the steam.

Several preferred forms of my invention which may be reduced to practice in many different ways are shown in the accompanying drawing in which Figure 1 represents a vertical section through my heater in connection with a small water receptacle such as might be conveniently used on a bureau for heating shaving water or for similar purposes. Figure 2 a vertical section showing my heater applied to a glue pot, Figure 3 a vertical section showing the modified form of my heater in connection with a boiler commonly used in the household for heating water and Figure 4 a horizontal cross section taken along line 4—4 of Figure 3. While I have shown only the preferred forms of my invention it should be understood that various changes or modifications may be made within the scope of the claims hereto attached.

Referring first to the device shown in Figure 1, a receptacle (1), which may be an ordinary cup or tumbler of small dimensions such as might be used for holding shaving water, is filled with water to a convenient level as shown in the drawing. My heater (2) which in this instance is shown as an independent unit adapted to be inserted and removed but which might as well be made a permanent integral part of the receptacle consists principally of two conducting plates (3) preferably made of carbon disposed vertically in spaced and parallel relation to one another and supported in a horizontal plate (4) of insulating material which latter is held in the upper portion of an inverted hood (6) provided with an upwardly extending hollow stem (7) terminating in a handle (8) of any convenient form. Metallic wires (9) and (11) connected with a source of electrical energy, not shown in the drawing, are guided through the hollow stem (7) and electrically connected with the two plates (3) as shown at (12). The hood itself is provided near its top with a small vent (13) and is shaped at the bottom so as to allow water to flow into the same which may be accomplished by cutting recesses (14) into the lower margin of the hood.

The operation of this device is as follows: The receptacle (1) is filled with water to a desired level and the heating unit inserted in the manner shown in Figure 1. The air entrapped by the hood is allowed to slowly escape through the vent (13). An electrical current passing through the wires (9) and (11) will traverse the body of water enclosed by the two plates and will heat said water due to its high resistance. This heat will communicate itself by circulation to the remainder of the water enclosed in the hood and will radiate from the hood through the whole body of water contained in the receptacle. As the water within the hood reaches the boiling point steam is generated and gradually forces the water out of the hood. The steam being a perfect insulator will prevent the passing of an electrical current between the plates in the steam covered area whereby the flow of current is gradually reduced until it finally approaches zero when practically all the water is forced out of the hood. I have found that when the receptacle is covered with heat insulating material so that very little heat is allowed to escape practically no current will be used by the heating unit after the boiling point has been reached or approached. If the receptacle is not insulated a little more current is used to compensate for the loss of heat due to radiation into the atmosphere and if cold water is added to the hot water in the receptacle the current begins to flow again until the whole body of water has been brought back to the boiling point.

In Figure 2 is shown a device working on the same principle adapted to be used as a heating means for a glue pot. It comprises a receptacle (16) adapted to receive the glue to be heated partly immersed in a larger receptable (17) filled with water. My heating unit is permanently attached to the latter receptacle in the manner shown in the drawing. A carbon plate (18) is supported in spaced relation to the wall of the receptacle with a washer (19) of insulating material interposed between the carbon plate and the wall. A second carbon plate (21) is held in spaced relation to the first carbon plate by an insulating washer (22) and both carbon plates are electrically connected with binding posts (23) disposed on the outside of the receptacle to which the wires (24) and (26) may be attached. A hood (27) open at the bottom and permanently secured to the wall of the receptacle covers the carbon plates, a small vent (28) allowing the air to escape that may be entrapped in the hood while the receptacle is filled with water.

The device shown in Figure 3 comprises a boiler (29) such as is commonly used in the kitchen for heating water. These boilers are ordinarily provided at their bottom with a threaded perforation (31) and my heating unit is constructed in such a manner that it may be introduced through said perforation. It comprises an insulating block (32) adapted to be threadedly introduced into said perforation supporting a plurality of carbon rods (33) extending into the boiler through a considerable distance and electrically connected with wires (34). An inverted hood (36) having a small vent (37) in its top and larger perforations (38) near its bottom is adapted to be screwed to a reduced portion of the block as shown at (39). A web (41) disposed near the top of the hood is used to hold the carbon rods in spaced relation. Four of these rods are used in the example shown in the drawing. The positive terminals of the source of electrical energy may be connected to two opposing carbon rods and the negative terminals to the other two carbon rods.

The principle on which the devices shown in Figures 2 and 3 operate will be readily understood from the foregoing description and does not differ from that governing the structure shown in Figure 1.

If it is desired to heat the water to a higher degree than is possible under atmospheric pressure as might be desirable in heat radiators or the like it is only necessary to increase the pressure on the surface of the water which will automatically cause the current to flow until a higher temperature has been reached since it requires additional steam pressure within the hood to drive the heated water out of the same.

It should be understood that my idea may be adapted to many different purposes and has been successfully used for sterilization of surgical instruments and materials and various other purposes not illustrated in the drawing.

I claim:

1. A self-controlling electric heater for water or the like, comprising two conductors disposed in spaced relation within the water, means for passing a current from one conductor to the other through the intervening body of water whereby the latter is heated and a hood covering the conductors adapted to entrap the steam generated by the heated water whereby the water is forced out of the space between the conductors and the flow of current reduced, said hood being provided with a small vent for allowing air entrapped during the initial operation to escape.

2. In an electric water heater, a shell embracing within it a pair of electrodes, an extension at the top of the shell for lowering it into water, electric wires passing through the shell and connected to the electrodes, means at the lower end of the shell for admitting water thereto when same is lowered into water, the upper end of the shell being closed and provided with a small aperture to permit escape of air entrapped in lowering the shell into water.

3. In an electric water heater, a cylindrical shell closed at one end and with an opening at the other end, a pair of carbon electrodes arranged longitudinally in spaced relation within the shell, a handle extending from the closed end of the shell, electric wires passing through the handle and connected to the electrodes, and a small aperture in the closed end of the shell.

FLOYD H. CHERRY.